H. SCHEIBEL, Jr., G. M. SEELEY & J. SCHNEIDER.
Car-Wheels.
No. 198,691. Patented Dec. 25, 1877.
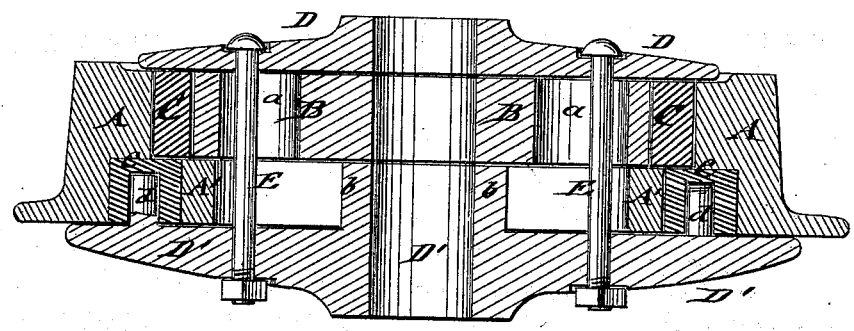
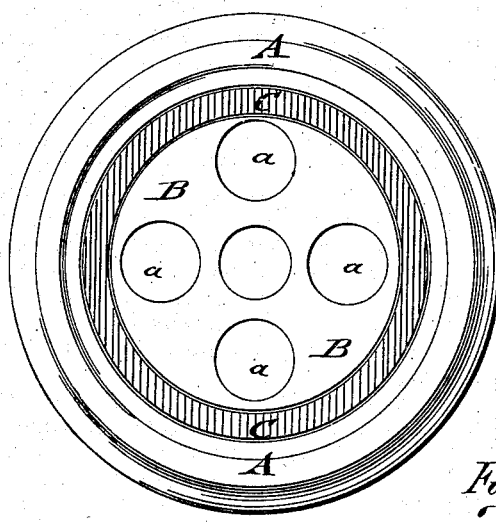
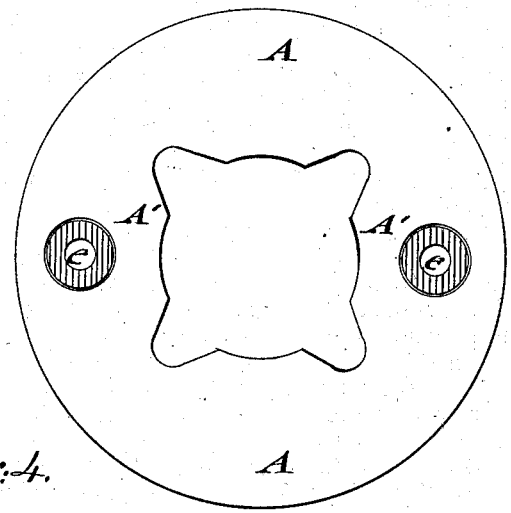
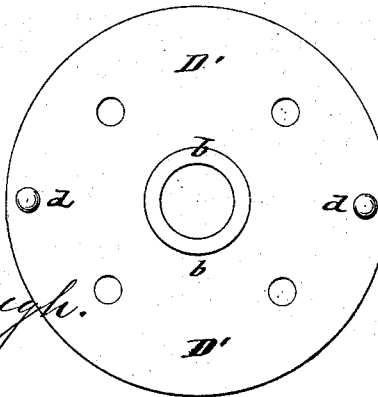
WITNESSES:
INVENTORS
H Scheibel Jr.
G. M. Seeley
BY J. Schneider
ATTORNEYS.

UNITED STATES PATENT OFFICE.

HENRY SCHEIBEL, JR., GEORGE M. SEELEY, AND JOHN SCHNEIDER, OF BRIDGEPORT, CONNECTICUT.

IMPROVEMENT IN CAR-WHEELS.

Specification forming part of Letters Patent No. 198,691, dated December 25, 1877; application filed July 30, 1877.

*To all whom it may concern:*

Be it known that we, HENRY SCHEIBEL, Jr., GEORGE M. SEELEY, and JOHN SCHNEIDER, of Bridgeport, county of Fairfield, and State of Connecticut, have invented a new and Improved Car-Wheel, of which the following is a specification:

In the accompanying drawing, Figure 1 represents a central horizontal section of our improved car-wheel; Fig. 2, a front view of the same, with face disk or plate detached; and Figs. 3 and 4 are detail views of the tire-section and of the rear disk detached.

Similar letters of reference indicate corresponding parts.

The invention relates to an improved construction of car-wheels, which is intended to absorb the jar, deaden the sound, and diminish the force of concussion, so that a better riding wheel and a reduced wear in the tire is obtained.

The invention will first be described in connection with the drawing, and then pointed out in the claims.

Referring to the drawing, A represents the tire-section; B, the inner web-section, and C the annular elastic packing that is interposed between the cylindrical faces of the tire and web, the packing and web being seated in the annular recess or angle formed by the tire, and an inward extension, A', of the tire-section. The web B is rigidly secured to the tire-section by means of outer face plates or disks D D', and by connecting cross-bolts E and nuts, that pass through annular recesses $a$ of the web, the recesses being made larger than required for the purpose of lightening the web and wheel. The hub of the car-wheel is formed by the web and the face-disks, the inner or rear disk having a hub, $b$, that extends to the web or middle section. The inner face-disk D' is made larger than the outer disk, being intended to extend to the flange, and strengthen the tire and flange. It is set by means of inwardly-projecting pins $d$ into rubber-cushioned sockets $e$ of the tire-section, so as to support the tire-section without impairing the elasticity of the same. This forms an essential feature of our car-wheel, as it admits the connection of the face-disks into the tire without producing any jar or noise. The elastic packing takes up the jar and concussion, and protects the tire against too rapid wear, while the inner web-section and face-disks impart the necessary strength to the wheel, which may be manufactured in easy and economical manner.

Having thus fully described our invention, we claim as new and desire to secure by Letters Patent—

1. The combination, in a car-wheel, of the tire A, disk D, web B, provided with openings $a$, and disk D', the latter having pins $d$ and hub $b$, as and for the purpose specified.

2. The combination of the tire-section, having cushioned socket-holes, with the inner face-disk, set by pins into the sockets of the tire, and extended outwardly to the flange, substantially as and for the purpose specified.

HENRY SCHEIBEL, JR.
GEO. M. SEELEY.
JOHN SCHNEIDER.

Witnesses for Scheibel and Schneider:
C. SEDGWICK,
PAUL GOEPEL.

Witnesses for Seeley:
M. B. BEARDSLEY,
ENOCH HINCKS.